(12) United States Patent
Muthiah

(10) Patent No.: US 7,525,925 B2
(45) Date of Patent: Apr. 28, 2009

(54) SYSTEM AND METHOD FOR SELECTING AN OPTIMAL TRANSPORT FORMAT COMBINATION USING PROGRESSIVE SET REDUCTION

(75) Inventor: Vijay N. Muthiah, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 890 days.

(21) Appl. No.: 10/750,008

(22) Filed: Dec. 31, 2003

(65) Prior Publication Data

US 2005/0141560 A1    Jun. 30, 2005

(51) Int. Cl.
*G01R 31/08* (2006.01)
(52) U.S. Cl. .......................... 370/252; 714/712
(58) Field of Classification Search ............... None
See application file for complete search history.

(56) References Cited

U.S. PATENT DOCUMENTS

| | | | | |
|---|---|---|---|---|
| 6,675,016 | B2* | 1/2004 | Lucidarme et al. | 455/452.2 |
| 6,813,284 | B2* | 11/2004 | Vayanos et al. | 370/537 |
| 7,058,032 | B2* | 6/2006 | Iacono et al. | 370/329 |
| 2002/0085531 | A1 | 7/2002 | Herrmann et al. | |
| 2003/0053344 | A1 | 3/2003 | Herrmann | |
| 2005/0094656 | A1* | 5/2005 | Rao et al. | 370/431 |
| 2005/0128986 | A1* | 6/2005 | Vayanos et al. | 370/335 |
| 2006/0274783 | A1* | 12/2006 | Terry et al. | 370/465 |

FOREIGN PATENT DOCUMENTS

| | | |
|---|---|---|
| EP | 1 349 332 | 10/2003 |
| WO | WO 01/63855 | 8/2001 |
| WO | WO 02/065675 | 8/2002 |

* cited by examiner

*Primary Examiner*—Firmin Backer
*Assistant Examiner*—Phuongchau B Nguyen
(74) *Attorney, Agent, or Firm*—Lisa K. Jorgenson; William A. Munck

(57) ABSTRACT

A system and method is disclosed for selecting an optimal transport format combination using progressive set reduction. A base station in a third generation wireless telecommunication system assigns a transport format combination set to user equipment (UE). The system and method of the invention selects a best-fit transport format combination (TFC) by progressively identifying TFC candidates in the transport format combination set that are not best-fit candidates in the UE. The system and method of the invention progressively reduces the complete TFC Set to a much smaller TFC Set to be searched through for the best-fit TFC at most times in the UE. This significantly reduces the search time in the UE. The non best-fit candidates are progressively deleted until only one TFC candidate remains. The sole remaining TFC candidate is the optimal best-fit TFC candidate.

25 Claims, 13 Drawing Sheets

OPEN SYSTEMS INTERCONNECTION (OSI) LAYERS

700

| TFCI | $TFI_1$ | $TFI_2$ | $TFI_3$ | $TFI_4$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 0 | 0 | 1 |
| 7 | 0 | 1 | 1 | 0 |
| 8 | 0 | 1 | 1 | 1 |

900

| TFCI | DCH1 | DCH2 | DCH3 | DCH4 |
|---|---|---|---|---|
| | TFI LIST (TFC SET) | | | |
| 0 | 1 | 0 | 0 | 0 |
| 1 | 0 | 1 | 0 | 0 |
| 2 | 1 | 1 | 0 | 0 |
| 3 | 0 | 1 | 1 | 0 |
| 4 | 1 | 1 | 1 | 0 |
| 5 | 0 | 2 | 0 | 0 |
| 6 | 1 | 2 | 0 | 0 |
| 7 | 0 | 2 | 1 | 0 |
| 8 | 1 | 2 | 1 | 0 |
| 9 | 0 | 2 | 1 | 1 |
| 10 | 1 | 2 | 1 | 1 |

1100

| TFCI | DCH1 | DCH2 | DCH3 | DCH4 |
|---|---|---|---|---|
|  | TFI LIST (TFC SET) | | | |
| 6 | 1 | 2 | 0 | 0 |
| 8 | 1 | 2 | 1 | 0 |
| 10 | 1 | 2 | 1 | 1 |

1200

| TFCI | DCH1 | DCH2 | DCH3 | DCH4 |
|---|---|---|---|---|
|  | TFI LIST (TFC SET) | | | |
| 8 | 1 | 2 | 1 | 0 |
| 10 | 1 | 2 | 1 | 1 |

1300

| TFCI | DCH1 | DCH2 | DCH3 | DCH4 |
|---|---|---|---|---|
|  | TFI LIST (TFC SET) | | | |
| 8 | 1 | 2 | 1 | 0 |

SYSTEM AND METHOD FOR SELECTING AN OPTIMAL TRANSPORT FORMAT COMBINATION USING PROGRESSIVE SET REDUCTION

TECHNICAL FIELD OF THE INVENTION

The present invention is directed, in general, to telecommunications and, more specifically, to a system and method for selecting an optimal transport format combination among active dedicated transport channels using progressive set reduction in a third generation mobile user equipment.

BACKGROUND OF THE INVENTION

In a protocol stack of a third generation Universal Mobile Telecommunications System (UMTS) user equipment (UE), the Medium Access Control (MAC) layer schedules the uplink signaling and user plane data from the higher layer Radio Link Control (RLC) data buffers. This scheduling is based on the delay criticality and amount of the data waiting for transmission. The data buffers correspond to the information carried by the different radio bearers in the UMTS system. The radio bearer configurations are dynamic in nature based on the resource needs and are assigned to the MAC layer by the Radio Resource Control (RRC) layer, which receives them from the system messages for the specific user equipment (UE). The MAC layer is the lowest layer in the protocol stack and thereby controls the resource usage by the user equipment (UE).

The optimal resource allocation to user equipment (UE) is based on the Quality of Service (QoS) requirements of the Third Generation Partnership Project (3GPP) applications that run on the user equipment (UE). This "need based" usage of bandwidth plays a pivotal role in providing packet-switched data orientated services in a 3GPP network. The implementation of the QoS is achieved through the allocation and subsequent scheduling of user data traffic on the radio bearers, based on priority levels assigned to them. Also of critical importance is the transmission time intervals (TTIs) (which take into account the delay limits of different application classes) assigned to the dedicated transport channels in the user equipment (UE) to which the above radio bearers are mapped. The scheduling of the data from the various dedicated transport channels (DCH) at the MAC layer at any given time is done within the constraints of the given transport format combination set (TFCS) that is given to the user equipment (UE) by the network.

There is a need in the art for an improved system and method for selecting an optimal transport format combination (TFC) from the transport format combination set (TFCS) that the network provides to the user equipment (UE). There is also a need in the art for an improved system and method for increasing the speed of the search process for selecting a transport format combination (TFC) from a transport format combination set (TFCS).

SUMMARY OF THE INVENTION

To address the deficiencies of the prior art, it is a primary object of the present invention to provide a system and method for selecting an optimal transport format combination (TFC) from a transport format combination set (TFCS) using progressive set reduction of the transport format combination set (TFCS).

The present invention comprises a system and method for employing an iterative algorithm to select a "best-fit" TFC at each start boundary of the smallest transmission time interval (TTI) among the active DCHs in the user equipment (UE). During each TFC selection, the algorithm iteratively narrows down the input candidate TFC Set (or subset from a previous TTI) to further smaller subsets through elimination of some TFCs by applying certain elimination constraints (to be explained in more detail later).

The new smaller subset becomes the input TFC Set to the algorithm for the TFC selection at the next TTI boundary. This procedure of reducing the input TFC Set continues until the smallest TTI boundary coincides with the longest boundary TTI. At the longest boundary TTI instant, the algorithm resets the input TFC Set to the complete TFC set provided to the user equipment (UE) by the network. The algorithm of the invention reduces a relatively large TFC Set to a much smaller TFC Set (which is used at most TTI boundaries) so that the search process to select a transport format (TF) for each DCH is faster than it would otherwise be.

In the procedure described above, each of the selected transport formats (TFs) for the DCHs further imposes conditions on the remaining TFC candidates (first elimination constraint). This helps to eliminate those TFC candidates that do not have the above selected transport format (TF) in them and thus cannot be considered to be one of the "best-fit" TFC candidates. The iteration constraint mentioned above together with some additional iteration constraints (to be more fully described later) are used in the iterations of the algorithm to ensure quick convergence to the most likely "best-fit" TFC candidates and to the selection of the most appropriate or "best-fit" TFC at the given TTI instant. The "best-fit" TFC candidate optimally schedules data from the different Radio Link Control (RLC) buffers for the Quality of Service (QoS) requirements in the user equipment (UE) protocol stack.

It is an object of the present invention to provide an improved system and method for identifying a "best-fit" TFC in a transport format combination (TFC) set at the given TTI boundary that mandates TFC selection for the applicable active DCHs.

It is also an object of the present invention to provide an improved system and method for iteratively applying certain identified elimination constraints of the TFC Set or Subset to reduce it to a smaller TFC Subset that becomes the input TFC Set to the algorithm at the next TTI boundary, until the TTI boundary coincides with the longest TTI boundary, in order to significantly reduce the search time of the algorithm.

It is another object of the present invention to provide an improved system and method for progressively deleting those TFC candidates from a transport format combination (TFC) Set that do not meet the set reduction constraints.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 15, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications system.

Figure 1:
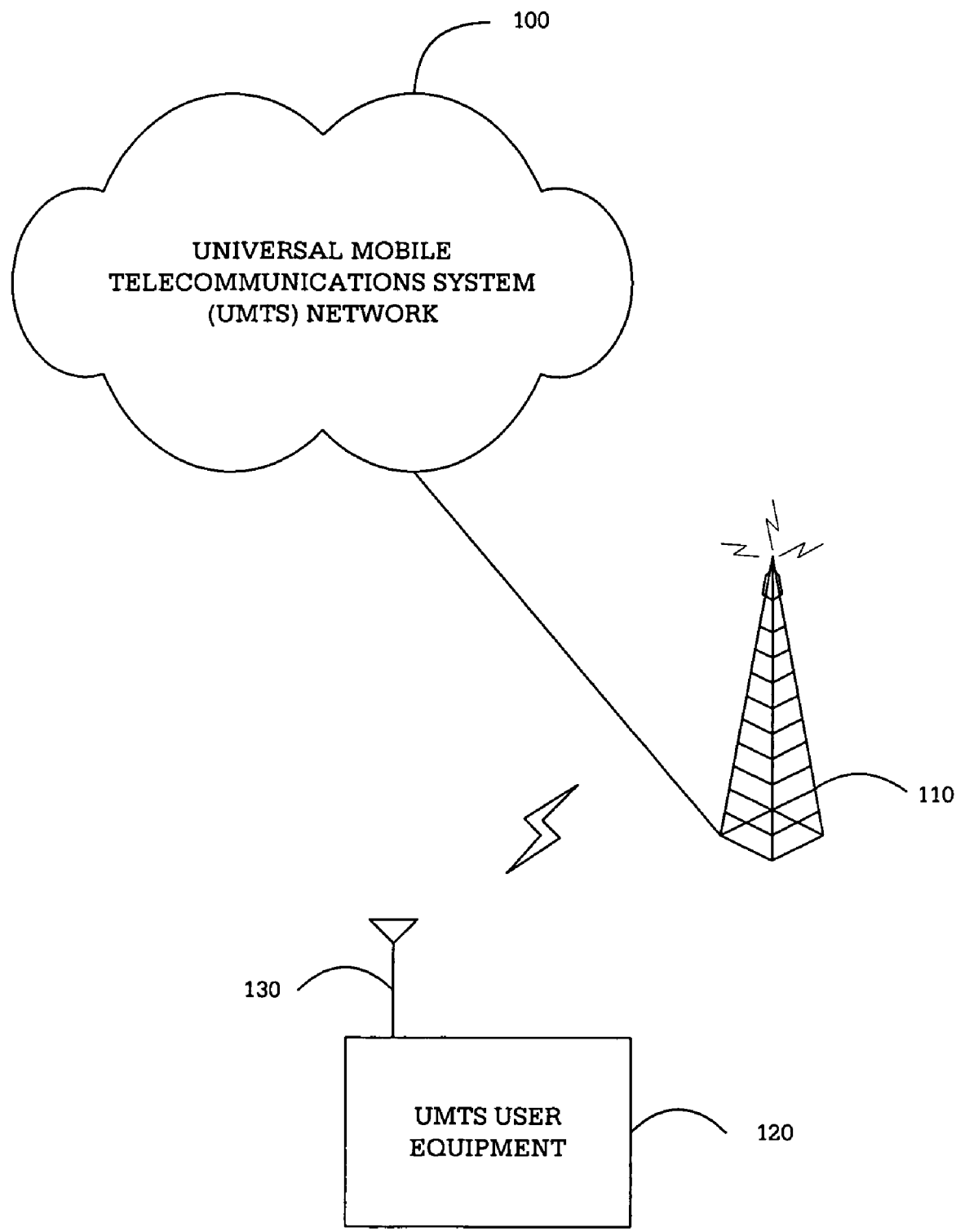
FIG. 1 illustrates an exemplary prior art universal mobile telecommunications system (UMTS) and an exemplary unit of UMTS user equipment constructed in accordance with the principles of the present invention.

FIG. 1 illustrates an exemplary prior art universal mobile telecommunications system (UMTS) 100 and an exemplary unit of UMTS user equipment (UE) 120 constructed in accordance with the principles of the present invention. The UMTS 100 shown in FIG. 1 is a Third Generation Partnership Project (3GPP) network 100 (sometimes simply referred to as "network 100" in this patent document). Network 100 is connected to an exemplary radio tower 110 that sends signals from network 100 to UMTS user equipment (UE) 120 through antenna 130 of UE 120. Radio tower 110 also receives signals from antenna 130 of user equipment (UE) 120 and sends the signals to network 100.

Figure 2:
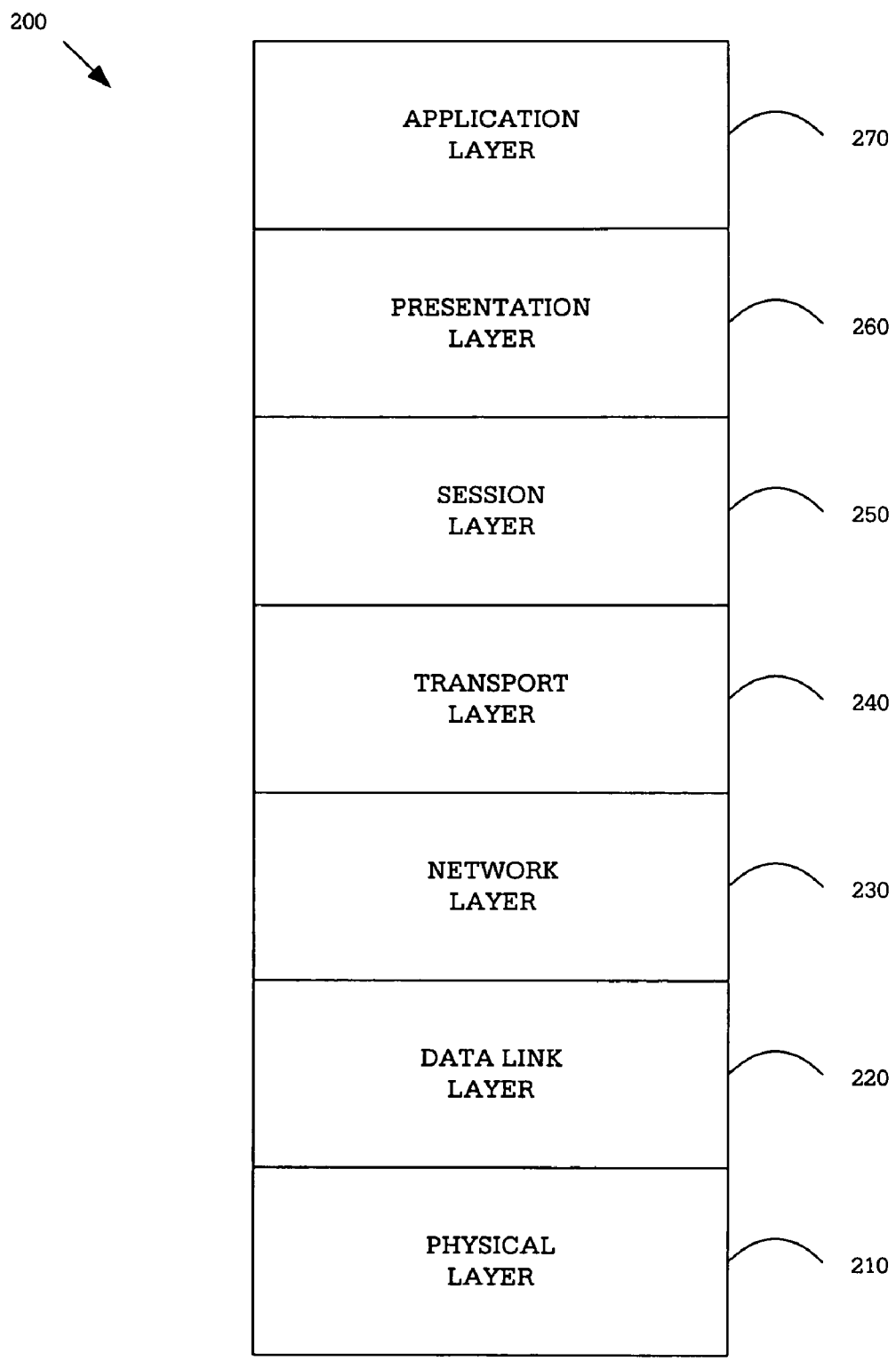
FIG. 2 illustrates seven prior art Open Systems Interconnection (OSI) network layers.

FIG. 2 illustrates seven prior art Open Systems Interconnection (OSI) network layers. These layers are well known in the art and are included here for reference. The first layer is Physical Layer 210, the second layer is Data Link Layer 220, the third layer is Network Layer 230, the fourth layer is Transport Layer 240, the fifth layer is Session Layer 250, the sixth layer is Presentation Layer 260, and the seventh layer is Application Layer 270.

Figure 3:
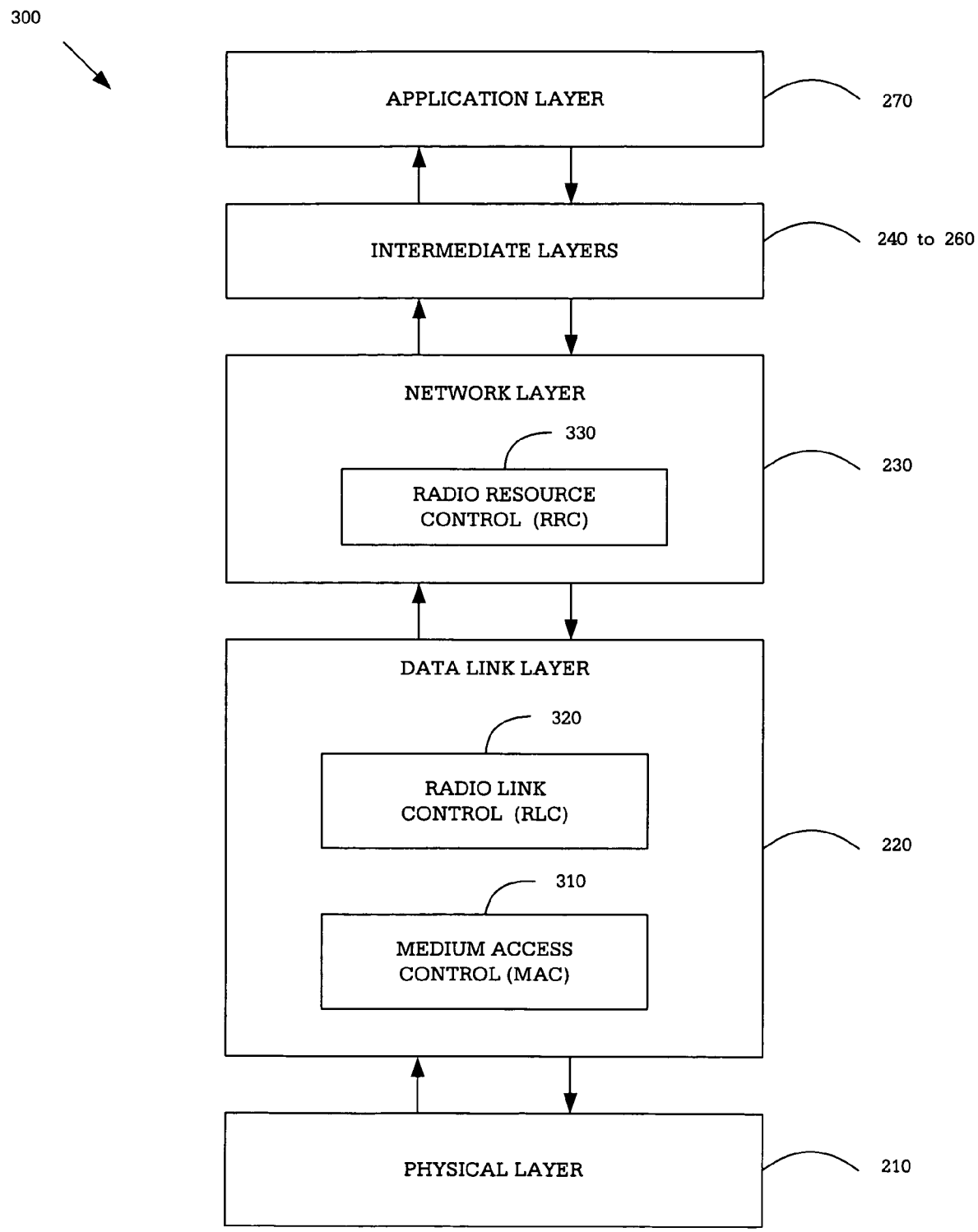
FIG. 3 illustrates a more detailed view of FIG. 2 showing elements of the Network Layer and of the Data Link Layer.

FIG. 3 illustrates a more detailed view of the prior art network layers of FIG. 2. Data Link Layer 220 comprises a Radio Link Control (RLC) layer 320 and a Medium Access Control (MAC) layer 310. Network Layer 230 comprises a Radio Resource Control (RRC) layer 330. These elements are well known in the art and are included here for reference.

The Radio Resource Control (RRC) layer 330 in Network Layer 230 sends control signals to the lower layers to control the configuration of the lower layers. In the Medium Access Control (MAC) layer 310 logical channels are mapped either to Dedicated Transport Channels (DCHs) or to Common Transport Channels. A Dedicated Transport Channel (DCH) defines the way in which traffic from the logical channels is provided to the Physical Layer 210 when the UE 120 is connected to network 100 in a dedicated mode. In the dedicated mode the UE 120 has certain resources allocated by the network 100 for the exclusive use of UE 120. These resources need to be used in the most bandwidth-efficient manner in order to provide the most optimal performance of user equipment (UE) 120.

The smallest portion of traffic that can be transmitted through a Dedicated Transport Channel (DCH) is called a Transport Block (TB). During a period of time called a Transmission Time Interval (TTI), a number of Transport Blocks (TBs) will be delivered to the Physical Layer 210. A set of specific characteristics to define the possible number of TBs and the sizes of the TBs that can be delivered to the Physical Layer 210 for a Dedicated Transport Channel (DCH) is called a Transport Format (TF).

Because UMTS user equipment (UE) 120 may simultaneously have more than one Dedicated Transport Channel (DCH), there may be a combination of a plurality of Transport Formats (TFs). A Transport Format Index (TFI) identifies Transport Formats uniquely within each DCH. The combination of Transport Formats (TFs) is called a Transport Format Combination (TFC). Each TFC is uniquely identified by a Transport Format Combination Indicator (TFCI). A list of Transport Format Combinations (TFC) that are allowable is called a Transport Formation Combination Set (TFCS). The TFCS is a list of applicable TFCs for the user equipment (UE) 120 and therefore encompasses the scheduling possibilities of all active DCHs.

The Universal Mobile Telecommunications System (UMTS) "Medium Access Control (MAC) protocol specification" is set forth in document 3GPP TS 25.321 (hereinafter referred to as the "MAC protocol"). The MAC protocol is hereby incorporated by reference for all purposes. The MAC protocol outlines the requirements for the MAC layer 310 to select a TFC for scheduling all data transmissions from the user equipment (UE) protocol stack. The design and implementation of the TFC selection process is entirely implementation specific. The TFC selection process algorithm can be considered to be the workhorse of a user equipment (UE) protocol stack. The TFC selection algorithm drives all the higher layers as far as the data transmission from the higher layers is concerned. Therefore, the performance of a UMTS mobile terminal is optimized by finding a "best-fit" TFC.

The selection of the TFC is done at every start boundary of the shortest (minimum) Transmission Time Interval (TTI) among the active Dedicated Transport Channels (DCHs) at the MAC layer 310. The most appropriate TFC to be selected at these times is determined by various factors that need to be carefully handled in order to select the particular TFC that guarantees maximum data transmission (limited by the data waiting to be transmitted). These factors include the data priority values, pre-selected Transport Formats (TF) within the TFC for other Dedicated Transport Channels (DCHs), and the Protocol Data Unit (PDU) data sizes for those selected values. Different priority values are assigned by the system to ensure that not all channels are scheduled to carry the maximum possible data in them. Otherwise the scheduled transmissions might even exceed the transmission capabilities of the user equipment.

Figure 4:
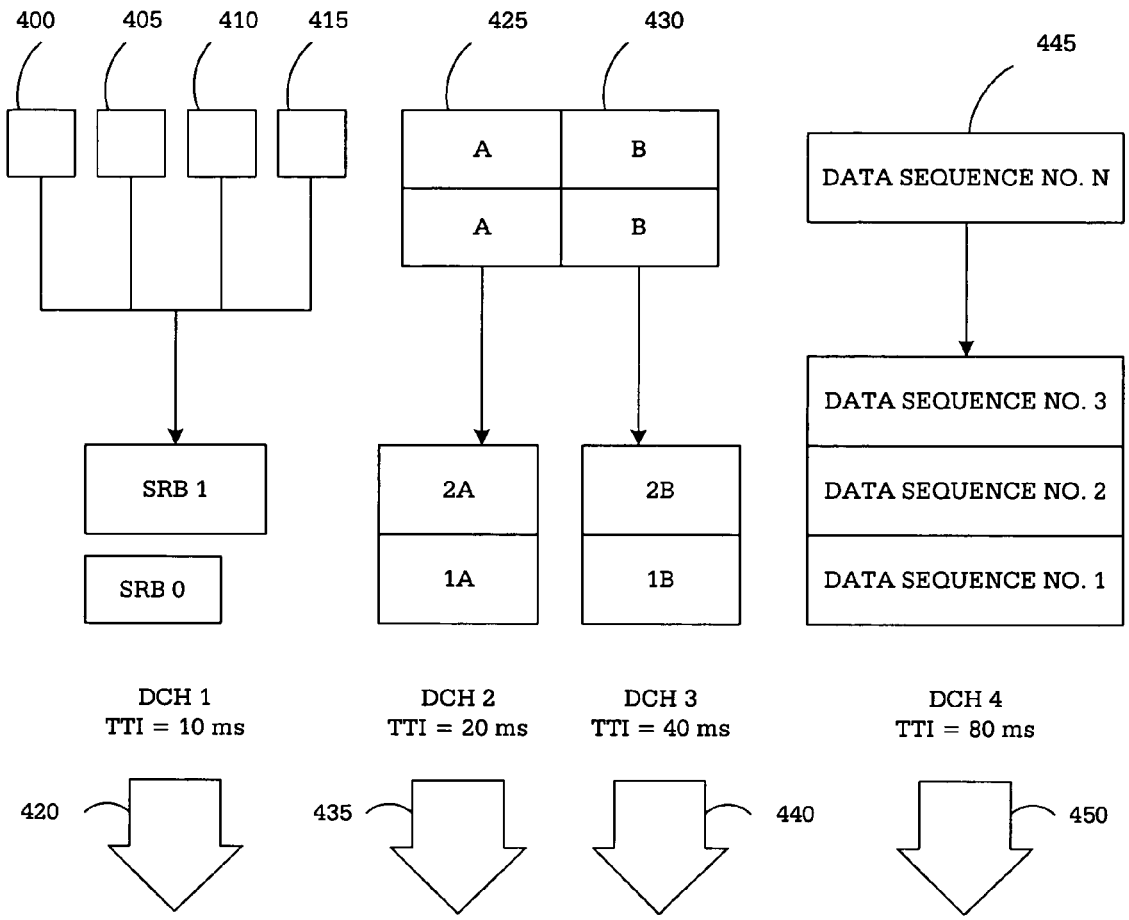
FIG. 4 illustrates a prior art example of data scheduling requirements for selecting a Transport Format Combination (TFC) in a multi-data scenario.

FIG. 4 shows a typical multi-data scenario in UMTS user equipment (UE). These parallel data streams map to the scheduling requirements of the TFC selection algorithm at the MAC layer 310. In the example shown here, the signaling bearers (400 to 415) from the Radio Resource Control (RRC) layer 330 and its higher layers are multiplexed to the first Dedicated Transport Channel 420 (DCH1 420). A NB-AMR Voice application maps a first set of frames 425 to the second Dedicated Transport Channel 435 (DCH2 435). The NB-AMR Voice application also maps a second set of frames 430 to the third Dedicated Transport Channel 440 (DCH3 440). Lastly, an Internet Protocol (IP) based application is channeled through the fourth Dedicated Transport Channel 450 (DCH4 450).

Figure 5:
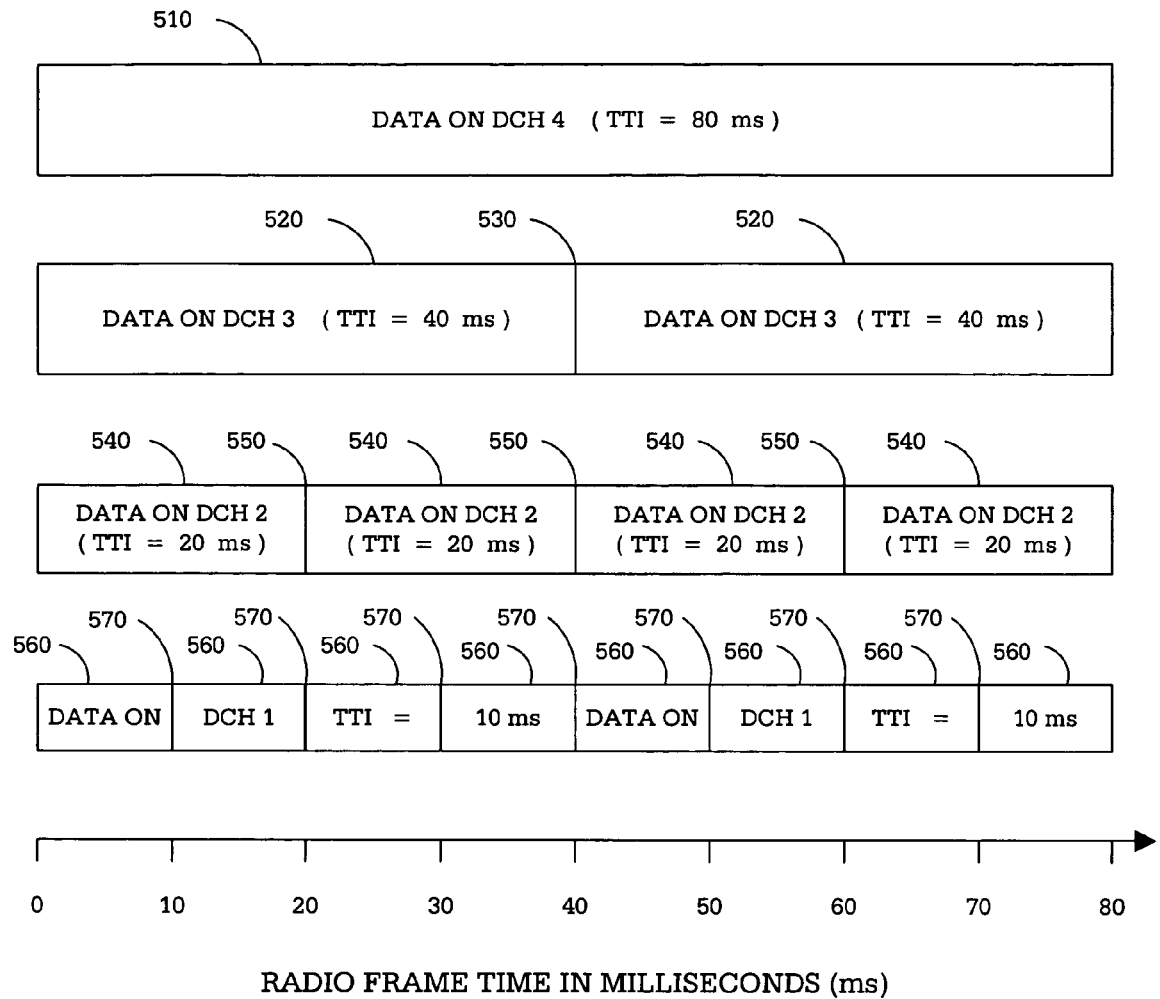
FIG. 5 illustrates an exemplary prior art transport channel timing diagram.

The network assigns the transmission time intervals (TTIs) for the DCHs in the example shown above, based on the transmission delay throughput requirements. FIG. 5 illustrates the simultaneously active transport channels with differing configurations (i.e., different values of TTIs) in the form of a timing diagram.

Data block 510 occupies eighty milliseconds (80 ms) of Radio Frame Time on DCH4. Data blocks 520 occupy forty milliseconds (40 ms) of Radio Frame Time on DCH3. The TTI boundary between data blocks 520 is designated with reference numeral 530. Data blocks 540 occupy twenty milliseconds (20 ms) of Radio Frame Time on DCH2. The TTI boundaries between data blocks 540 are designated with reference numeral 550. Lastly, data blocks 560 occupy ten milliseconds (10 ms) of Radio Frame Time on DCH1. The TTI boundaries between data blocks 560 are designated with reference numeral 570.

Figure 6:
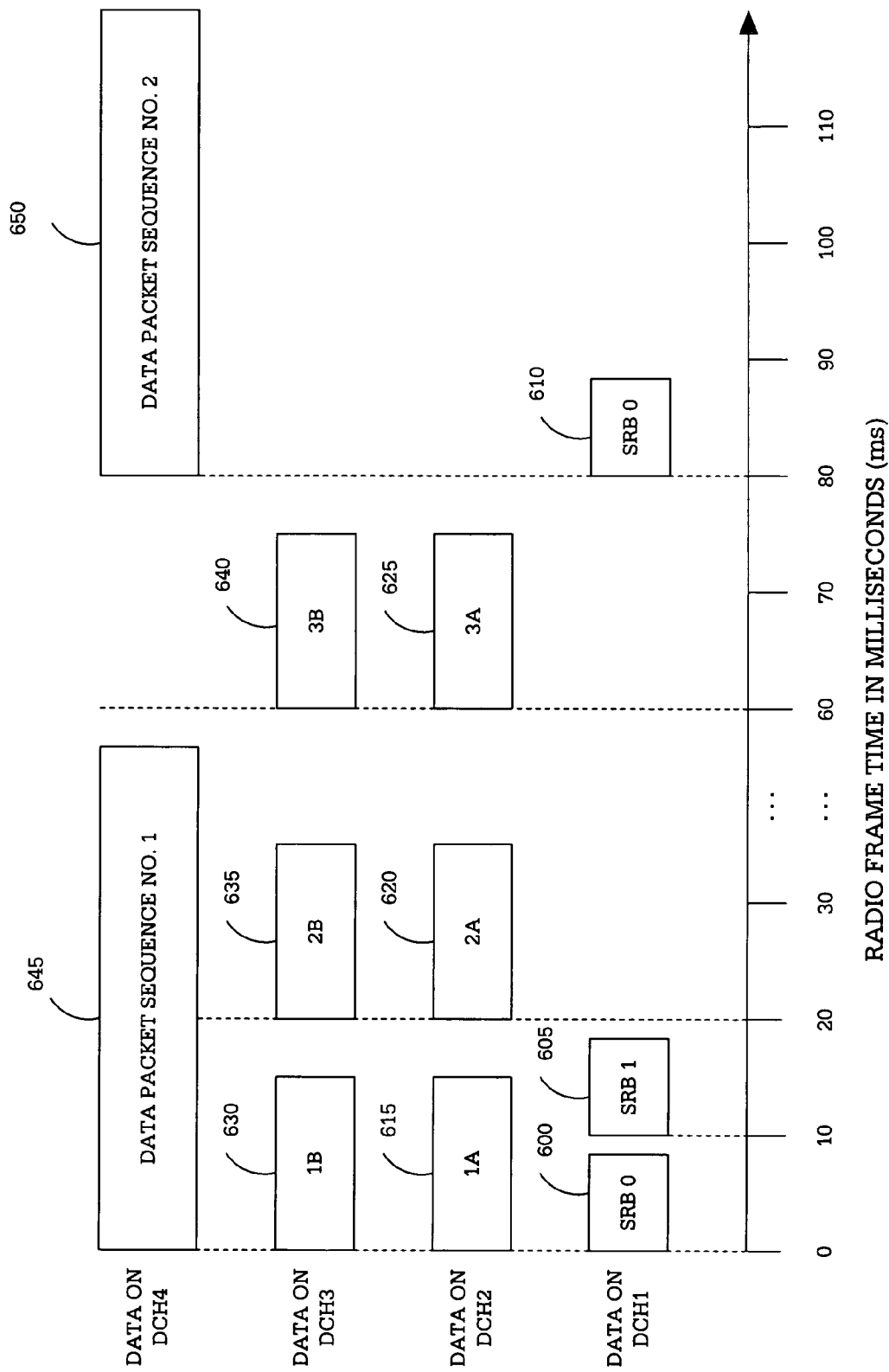
FIG. 6 illustrates an exemplary prior art dedicated transport channel (DCH) scheduling order and transmission time interval (TTI) time line.

FIG. 6 illustrates the time line of data transmissions (e.g., from user equipment (UE) 120) corresponding to the DCH configuration or the multi-data scenario explained above. Data transmissions 600, 605 and 610 are transmitted on DCH1. Data transmissions 615, 620 and 625 are transmitted on DCH2. Data transmissions 630, 635 and 640 are transmitted on DCH3. Data transmissions 645 and 650 are transmitted on DCH4.

Some illustrative TTI Start Boundaries are represented in FIG. 6 by vertical dotted lines. For example, the radio frame time of zero milliseconds (0 ms) is a TTI Start Boundary for the four data transmissions 600, 615, 630 and 645. The radio frame time of ten milliseconds (10 ms) is a TTI Start Boundary for transmission 605. The radio frame time of twenty milliseconds (20 ms) is a TTI Start Boundary for transmissions 620 and 635. FIG. 6 also shows that the zero millisecond (0 ms) TTI Start Boundary is the shortest TTI Start Boundary that coincides with the longest TTI Start Boundary (eighty milliseconds (80 ms)). That is, both transmission 610 and transmission 650 begin on the eighty millisecond (80 ms) TTI Start Boundary.

Figure 7:
FIG. 7 illustrates an exemplary prior art Transport Format Combination (TFC) Set assigned to a Medium Access control (MAC) layer.

FIG. 7 illustrates a sample TFC set 700 assigned to the MAC layer 310 for scheduling the data from the different data streams described earlier. The following points apply for any given TFC configuration for the MAC layer 310 for the TFC selection algorithm:

$TFI_1$ corresponds to DCH1. $TFI_2$ corresponds to DCH2. $TFI_3$ corresponds to DCH3. $TFI_4$ corresponds to DCH4.

The TFIs correspond to the number of Transport Block (TB) multiplied by the Transport Block (TB) size uniquely for each DCH.

The TFC selected could (potentially) change for every shortest TTI (e.g., ten (10) milliseconds).

The Modification/Activation of a new or updated TFC Set can be done only at the boundary of longest TTI. This new TFC Set is provided to the MAC layer 310 by the RRC layer 330.

Figure 8:
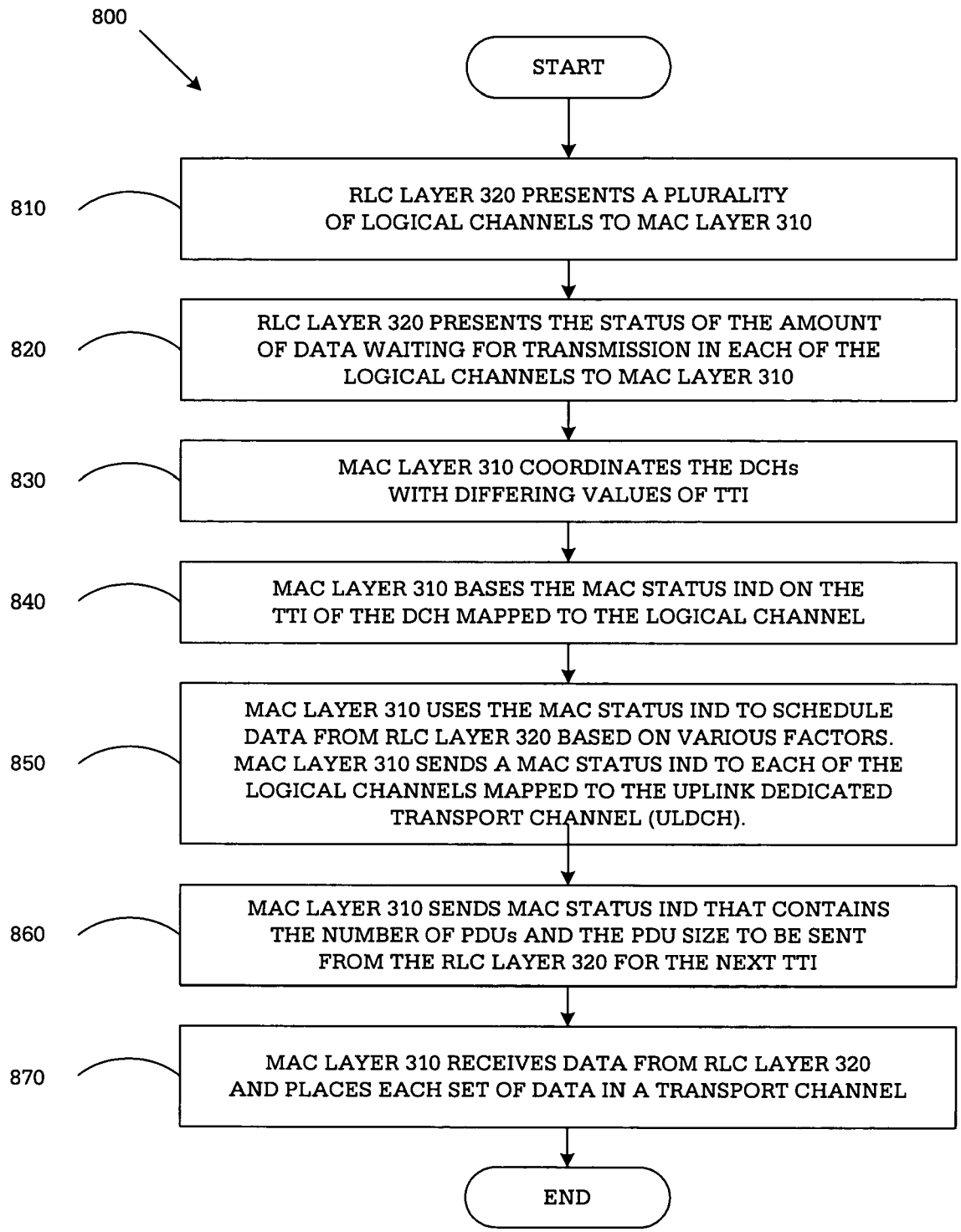
FIG. 8 illustrates an exemplary prior art method for scheduling data transmission between a Radio Link Control (RLC) layer and a Medium Access Control (MAC) layer in a prior art data link layer.

FIG. 8 illustrates an exemplary prior art event sequence 800 during the scheduling of the data at the RLC/MAC interface. FIG. 8 also provides an overview of the requirements provided to the TFC selection algorithm in the user equipment (UE) 120. The essence of the method shown in FIG. 8 is that the "best-fit" TFC selected ensures minimal delays based on the data criticality (QoS based MAC logical channel priorities assigned) and maximum throughput (within data transmission restrictions from the RLC layer 320.

In the first step the RLC layer 320 presents a plurality of logical channels to the MAC layer 310 (step 810). The RLC layer 320 presents the amount of data waiting for transmission in each of the logical channels mapped to the uplink dedicated transport channel (ULDCH) (step 820). This information is the input to the MAC layer 310 for scheduling the data from the logical channels based on various factors. The MAC layer 310 needs to schedule the data waiting on the logical channels onto transport channels that have different values of TTI in accordance with their configuration (step 830). The sending of a MAC STATUS IND signal to each logical channel of RLC layer 320 is based on these TTI values in order to schedule data at the correct radio frame boundaries from the UE 120 (step 840). The MAC layer 310 uses the MAC STATUS IND to schedule data from the logical channels. The scheduling (step 850) is based on various factors, which include buffer occupancy, MAC logical channel priority (based on application QoS) that is an absolute priority used to serve the logical channels, and the RLC mode. The MAC STATUS IND sent to RLC layer 320 contains the number of Protocol Data Units (PDUs) and the PDU size to be sent from the RLC layer 320 for the next TTI (step 860).

MAC layer 310 then receives data from the RLC layer 320 and places each set of data in a dedicated transport channel (step 870) in order to be sent to the Physical Layer 210 for transmission from the user equipment (UE) 120 to the network 100.

In the present invention, the dedicated transport channels (DCHs) that are active at a given TTI boundary generally need to be prioritized. If more than one DCH is active, then the DCHs need to be ordered (i.e., prioritized) before a Transport Format Combination (TFC) is selected for the given time instant. This is because after selecting a Transport Format (TF) for each of the active DCHs in the first iteration, the selection would be a constraint for selecting the TF for the next active DCH.

In this scenario, the DCHs need to be ordered based on the priorities of the logical channels, which have sufficient data waiting to be transmitted mapped to them. "Sufficient data" is enough data to fit in the smallest amount of non-zero data that can be transmitted using a valid TF for the DCH. Therefore at each boundary of the smallest TTI when the TFC selection algorithm is invoked, the DCHs that need TF selection are ordered (prioritized) as explained above and the Transport Formats (TFs) (within the TFC candidates) are selected beginning with the first iteration for the DCH that would carry the data from the highest priority logical channel.

When more than one logical channel is mapped the given transport channel has data waiting and has an amount of data that is greater than the smallest possible data block that can be scheduled from it (based on the TF constraints), the concerned multiplexed logical channels are scheduled in accordance with their priorities. The priorities are assigned by the network to the logical channels (absolute priorities) that correspond to the Quality of Service (QoS) requirements of the data. The scheduling ensures that the maximum possible statistical multiplexing gain is obtained when multiple sporadic logical channels are mapped to a single transport channel. The logical channels are served sequentially from the high priority logical channels to the lower priority logical channels. The sequential service of the logical channels stops where the maximum data that can be scheduled at that TTI is reached.

The TFC list at any given TTI boundary is the allowed TFC Set that would be reduced by the iterations of the algorithm to select a TF for each of the DCH for which data needs to be scheduled at the given instant of time. If the given TTI boundary coincides with the longest TTI boundary, as shown in FIG. 5, it would mean that a TF would be required to be selected for all the DCHs.

At subsequent TTI boundaries where only a lesser number of DCHs need TF selection, the TF selected in the previous TTI boundary for that DCH (or those DCHS) would have to be retained in the list of "candidate" TFCs to be considered at the current instant. This means that the TFC that could be selected at this time should include the TF already selected during the previous TTI boundary for a DCH(s) with a longer duration TTI. This pre-selected Transport Format Indicator (TFI) list forms the first constraint (selection constraint) to reduce the TFC Set.

In addition to the first constraint (selection constraint), two elimination constraints are also used to reduce the TFC Set. The first of the two elimination constraints comprises an "Identified TB Size" that corresponds to the PDU Size of the highest priority logical channel that is mapped to the DCH in question.

The second of the two elimination constraints comprises an "Implicit Zero Number" of Transport Blocks for the TF to ensure that a TF would be selected upon finding "no match" for scheduling the present data within the other constraints of the allowed TFC Set.

Figure 9:
FIG. 9 illustrates an exemplary Transport Format Combination (TFC) candidate list for illustrating the method of the present invention.

While selecting a TF for the DCHs at a given instant, a reduced TFC candidate list (based on the application of the constraints mentioned above) forms the input to the TFC selection algorithm. The TFC candidate list is sequentially reduced as shown in FIGS. 9-13. The form of the TFC candidate list 900 at the beginning of the algorithm process is shown in FIG. 9. The TFC candidate list is maintained dynamically during the iterations of the algorithm (one iteration each to select a TF for one of the active DCHs) at the same radio frame boundary and across radio frame boundaries until the time boundary coincides with the longest TTI.

Figure 10:
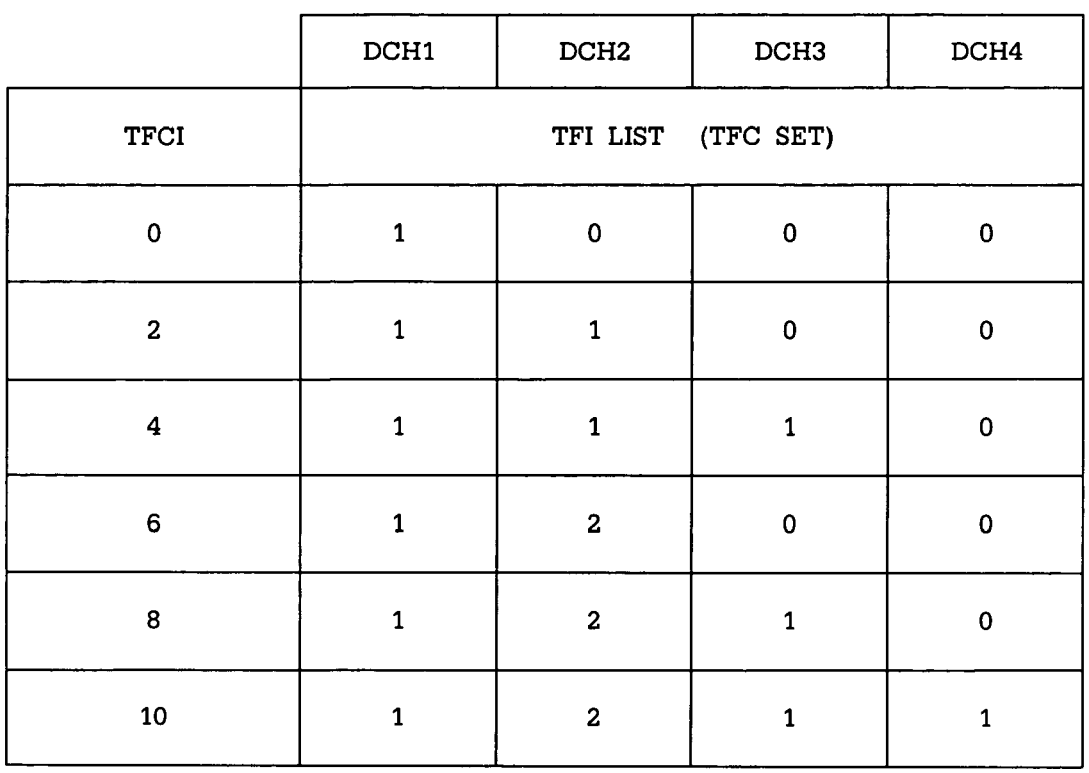
FIG. 10 illustrates a reduced TFC candidate list after application of an iteration of the method of the present invention to the TFC candidate list shown in FIG. 9.

FIG. 10 illustrates a reduced TFC candidate list 1000 that exists after the application of the first iteration of the algorithm to the TFC candidate list 900 shown in FIG. 9. The Set Reduction Constraints are applied to the TFC candidate set 900 to select the TF for Dedicated Transport Channel No. 1 (DCH1).

The TFC candidate set that exists when the algorithm starts the second (or higher) iteration is essentially the reduced TFC Set after applying the constraints. The reduced TFC Set is obtained through elimination of the non-qualifying TFC candidates. This leaves the algorithm a much simpler search to do to select the "best-fit" TF for the DCHs to accommodate as much data as possible from the different RLC instances based on their absolute priorities.

Figure 11:
FIG. 11 illustrates a reduced TFC candidate list after application of an iteration of the method of the present invention to the TFC candidate list shown in FIG. 10.

Continuing the description of the example, FIG. 11 illustrates a reduced TFC candidate list 1100 that exists after the application of the second iteration of the algorithm to the TFC candidate list 1000 shown in FIG. 10. The Set Reduction Constraints are applied to the TFC candidate set 1000 to select the TF for Dedicated Transport Channel No. 2 (DCH2).

Figure 12:
FIG. 12 illustrates a reduced TFC candidate list after application of an iteration of the method of the present invention to the TFC candidate list shown in FIG. 11.

Next, FIG. 12 illustrates a reduced TFC candidate list 1200 that exists after the application of the third iteration of the algorithm to the TFC candidate list 1100 shown in FIG. 11. The Set Reduction Constraints are applied to the TFC candidate set 1100 to select the TF for Dedicated Transport Channel No. 3 (DCH3).

Figure 13:
FIG. 13 illustrates a selected TFC candidate list after application of an iteration of the method of the present invention to the TFC candidate list shown in FIG. 12.

Lastly, FIG. 13 illustrates a reduced TFC candidate list 1300 that exists after the application of the fourth iteration of the algorithm to the TFC candidate list 1200 shown in FIG. 12. The Set Reduction Constraints are applied to the TFC candidate set 1200 to select the TF for Dedicated Transport Channel No. 4 (DCH4). The TFC candidate list 1300 is the "best-fit" TFC at the selected TTI boundary.

Figure 14:
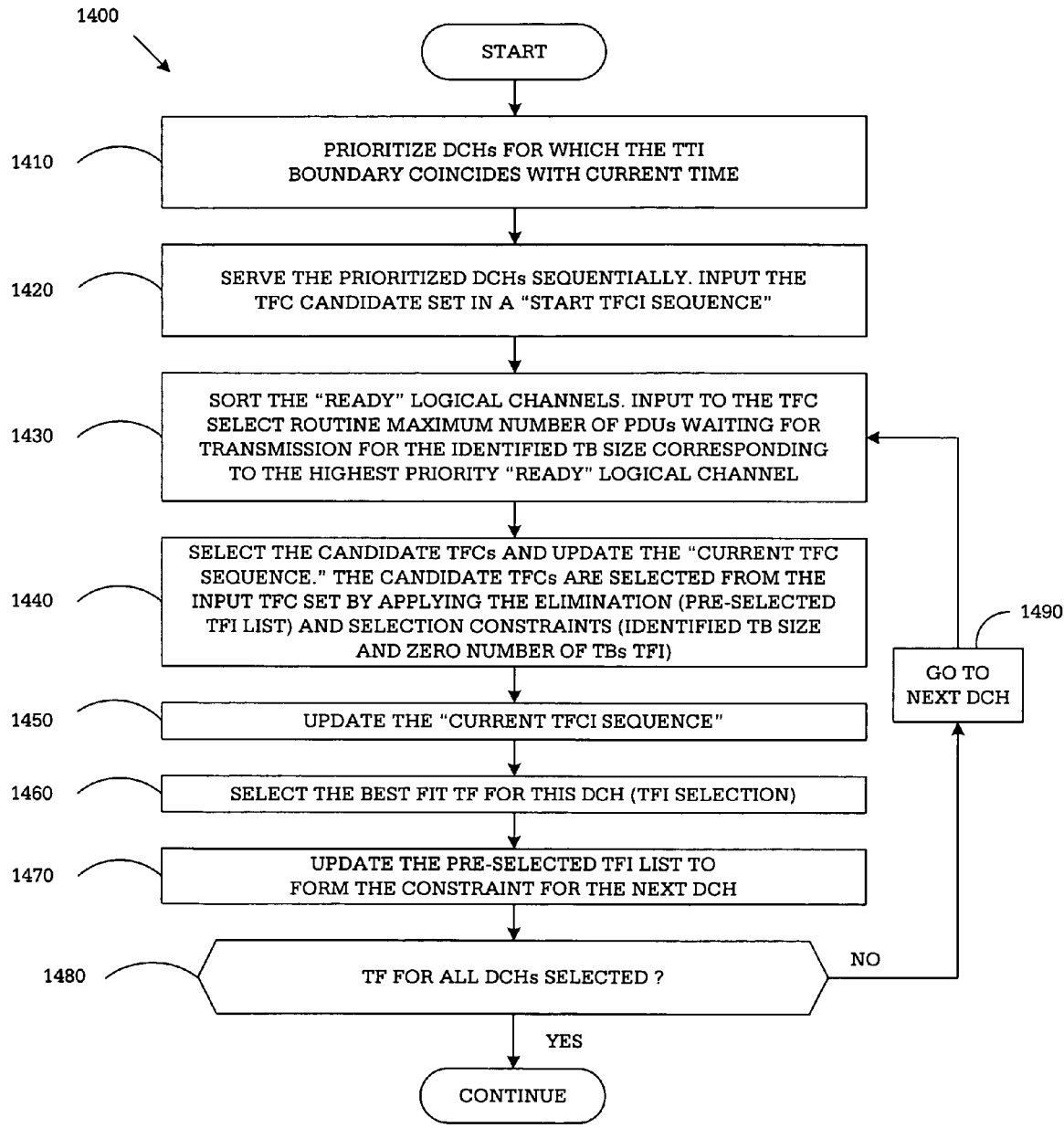
FIG. 14 illustrates a flow chart showing the operation of an advantageous embodiment of the method of the present invention for TFC selection.

FIG. 14 illustrates a flow chart of the algorithm of the invention for selecting the "best-fit" TFC through the progressive reduction of the TFC Set (through iterations to select TFs for the DCHs at the given time instant). The steps of the method are collectively referred to with the reference numeral 1400.

"TFCI Sequence" refers to the quick lookup reference to the TFC Set/Subset (that is being reduced iteratively) at any given instance. The usage of a TFCI Sequence is to reduce memory usage in the algorithm through storage of references to the TFC Set in a "TFCI Sequence" ("Start TFCI Sequence" as the input and "Current TFCI Sequence" as the output) and not the TFC Set within routines of the algorithm.

In the first step the Dedicated Transport Channels (DCHs) for which the TTI start boundary coincides with current time are prioritized before the TF for each of them is selected (step 1410). The Logical Channel priorities are used to derive and order the priorities of the DCHs. The prioritized DCHs are then served sequentially and the TFC candidate set is input in a "Start TFCI Sequence." (step 1420). The "Ready" Logical Channels (which have data ready to be transmitted—AT LEAST ONE PDU of the highest priority logical channel) are then sorted by their descending order of priority and the maximum number of PDUs waiting for transmission is input to the "TFC Select Routine." (step 1430).

The priority sort of the "Ready" Logical Channels (which have data ready to be transmitted) may be conducted by a bubble sort (or a swap if only two logical channels are present). The sorting is done to serve logical channels with lower priority sequentially (the maximum that can be accommodated within the TF). The size of the Transport Block (TB) ("TB Size") to be looked for in the TFC Set is identified.

Then the candidate TFCs are selected and the "Current TFCI Sequence" is updated (step 1440). The candidate TFCs are selected from the input TFC Set ("Start TFCI Sequence") based on (a) the pre-selected TFIs (i.e., the TFI List for matching), and (b) the TFCs with the identified TB Size, and (c) the number of TB that equal zero for this DCH for the TFC Null-Match cases. The "Current Sequence of TFCI" is updated (step 1450). The updated (reduced) "Current Sequence of TFCI" becomes the new input TFC candidate list ("Start TFCI Sequence") for the next TF selection which will be done either at the current TTI boundary or the next TTI boundary depending on the TTI configuration of the DCHS.

The "best-fit" TF for the DCH is then selected (i.e., "TFI selection")(step 1460). Then the Pre-Selected TFI List is updated to form the constraint for the next DCH (step 1470). A determination is then made whether a TF has been selected for all of the DCHs (decision step 1480). If not all of the DCHs have been processed, the control goes to the next DCH (step 1490) and a TF is selected for the next DCH by the next iteration beginning at step 1430. If all of the DCHs have been processed, the TFC selection algorithm is complete for this radio frame boundary (TTI boundary).

Figure 15:
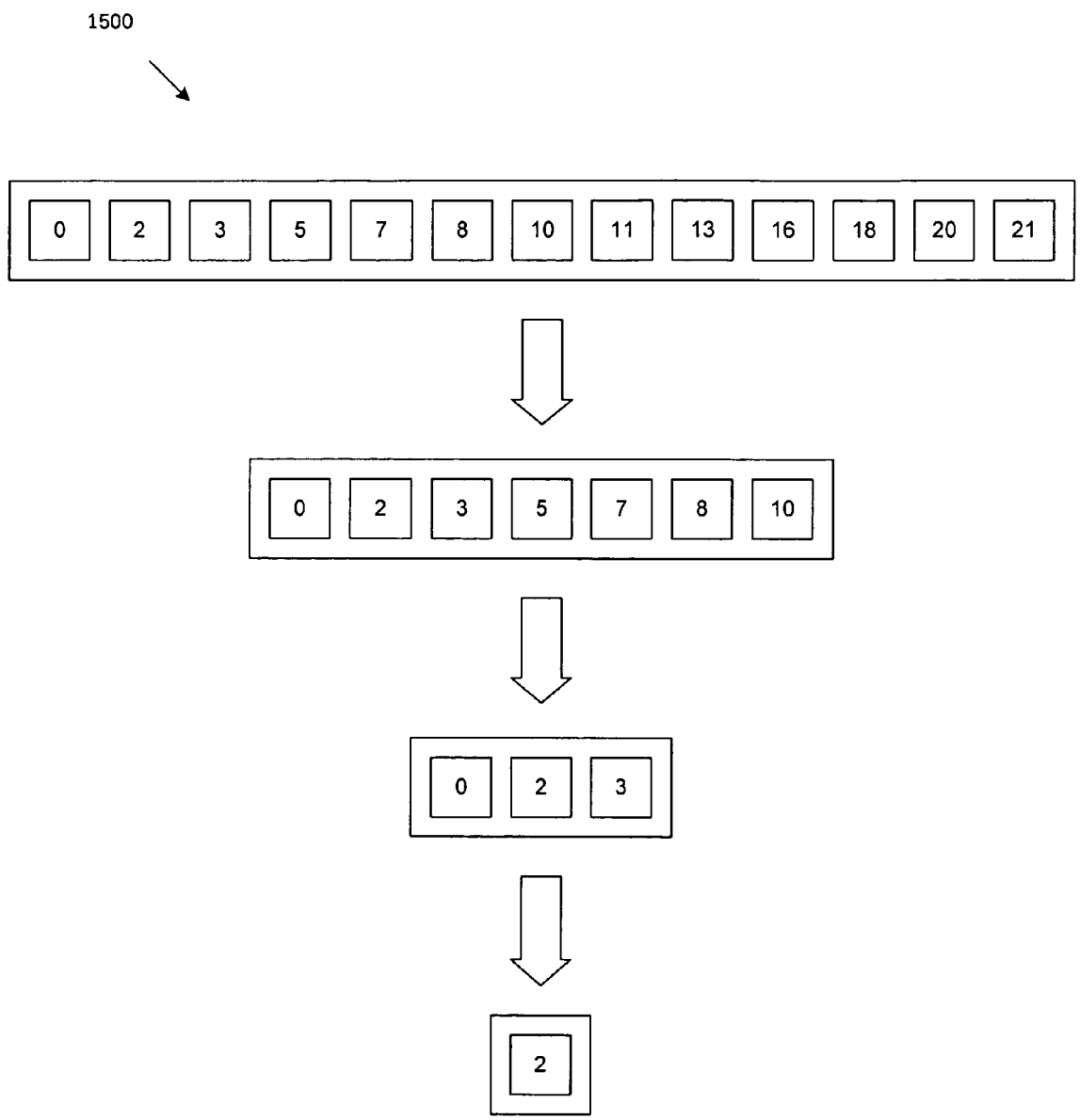
FIG. 15 illustrates an example of TFC Set reduction using TFCI Sequences in an advantageous embodiment of the method of the present invention.

FIG. 15 illustrates an example of TFC Set reduction using TFCI Sequences. The TFC Set reduction is generally denoted with reference numeral 1500. The TFC Set reduction is done through the update of two TFCI sequences: (1) Start "TFCI Sequence" and (2) "Current TFCI Sequence" after each iteration of the algorithm (that selects a particular TF for a DCH). The "Current TFCI Sequence" at the end of an iteration becomes the "Start TFCI Sequence" for the subsequent iteration as shown in FIG. 15.

The first line of FIG. 15 illustrates the "Start TFCI Sequence 1." The second line of FIG. 15 illustrates the "Current TFCI Sequence 1." The "Current TFCI Sequence 1" is the same as the "Start TFCI Sequence 2." The third line of FIG. 15 illustrates the "Current TFCI Sequence 2." The "Current TFCI Sequence 2" is the same as the "Start TFCI Sequence 3." Lastly, the fourth line of FIG. 15 illustrates the Selected TFCI.

The TFCI Sequence is considered as the TFC Set itself as each TFCI corresponds to a unique TFC. This may be summarized as follows:

(1) The algorithm of the invention reduces the TFC Set for the next transport channel at the same radio frame boundary and the next frame as well. Excluding the time instant coinciding with the longest radio frame boundary, the TFC selection algorithm needs to handle only the smaller TFC Sets (i.e., subsets and not the whole set) to select the "best-fit" TFC. This reduces the search time significantly (depending on the size of the complete TFC Set and the TFIs selected for certain DCHs).

(2) The progressive iterations of the algorithm make the algorithm much quicker by giving a reduced candidate TFCI sequence for the TF selection for the other transport channels either in the current radio frame boundary or in subsequent radio frames contained within the longest TTI.

In this manner, the TFC Set Reduction is achieved through the application of multiple constraints on the algorithm. The constraints are: (1) the Pre-Selected TFI List (the elimination constraint), and (2) the Identified TB Size (the first selection constraint), and (3) the TB Zero Number (the second selection constraint).

The progressive reduction of the TFC Set (using TFCI Sequences) through the elimination of Non-Candidates in the TFC Set is based on the intersection of a smaller set (the constraints identified above) with the larger TFC Set. The reduction of the TFC Set would be most beneficial when the number of Dedicated Transport Channels (DCHs) is higher and the transmission time intervals (TTIs) are different due to the significant reduction in the search depth of the algorithm within the configured complete TFC Set.

The TFC Set that is used to select the "best-fit" TFC is a reduced set for the TF selection to be done for the second and subsequent DCHs scheduled for data transmission at the same radio frame boundary as well as subsequent radio frame boundaries until the time boundary that coincides with the longest TTI among the active DCHs in the User Equipment (UE) 120. The algorithm of the invention forms the backbone of the UMTS User Equipment (UE) 120 data transmission scheduling. The algorithm of the invention therefore plays a critical role in reducing the overall system delay, increasing data throughput and decreasing power consumption.

Although the present invention has been described in detail, those skilled in the art will understand that various changes, substitutions, and alterations herein may be made without departing from the spirit and scope of the invention it its broadest form.

What is claimed is:

1. For use in a wireless telecommunication system comprising a base station and a plurality of mobile stations, a method for selecting a best fit transport format combination (TFC) from a transport format combination set that is assigned to at least one mobile station by said base station, said method comprising the steps of:
    identifying TFC candidates in said transport format combination set that are not best fit candidates;
    deleting from said transport format combination set said TFC candidates that are not best fit candidates until a sole TFC candidate remains;
    identifying said sole remaining TFC candidate as a best fit TFC candidate;
    iteratively applying at least one set reduction constraint to said transport format combination set; and
    deleting TFC candidates from said transport formation combination set that do not meet said at least one set reduction constraint.

2. The method as set forth in claim 1 wherein said at least one set reduction constraint comprises one of: a pre-selected transport format indicator list, an identified size of a transport block, and a number of transport blocks that equal zero.

3. The method as set forth in claim 2 wherein said identified size of a transport block corresponds to a size of a protocol data unit of a highest priority logical channel mapped to a dedicated transport channel.

4. The method as set forth in claim 1 wherein said method further comprises the steps of:
applying an iterative TFC selection algorithm to said transport format combination set;
progressively deleting TFC candidates from said transport format combination set that said iterative TFC selection algorithm identifies as not best fit TFC candidates.

5. The method as set forth in claim 4 wherein said iterative TFC selection algorithm comprises the steps of:
executing a first iteration to select a first transport format for a first dedicated transport channel of said transport format combination set;
deleting from said transport format combination set all TFC candidates that do not have said first transport format for said first dedicated transport channel.

6. The method as set forth in claim 5 wherein said iterative TFC selection algorithm further comprises the steps of:
sequentially executing additional iterations to sequentially select additional transport formats for additional dedicated transport channels of said transport format combination set;
deleting from said transport format combination set all TFC candidates that do not have said additional transport formats for said additional dedicated transport channels.

7. The method as set forth in claim 6 wherein said iterative TFC selection algorithm further comprises the steps of:
continuing said iterations and said deletions until a sole TFC candidate remains; and
identifying said sole remaining TFC candidate as a best fit TFC candidate.

8. The method as set forth in claim 6 wherein said iterative TFC selection algorithm further comprises the steps of:
updating a Start TFCI Sequence after each iteration of said TFC selection algorithm; and
updating a Current TFCI Sequence after each iteration of said TFC selection algorithm;
wherein said Current TFCI Sequence at the end of an iteration becomes a Start TFCI Sequence for the next iteration.

9. The method as set forth in claim 8 wherein said iterative TFC selection algorithm further comprises the steps of:
continuing to execute iterations of said TFC selection algorithm until a sole TFCI sequence remains; and
identifying said sole remaining TFCI sequence as a best fit TFC candidate.

10. For use in a wireless telecommunication system comprising a base station and a plurality of mobile stations, a method for selecting a best fit transport format combination (TFC) from a transport format combination set that is assigned to at least one mobile station by said base station, said method comprising the steps of:
applying an iterative TFC selection algorithm to said transport format combination set to identify TFC candidates that are not best fit candidates;
deleting from said transport format combination set said TFC candidates that are not best fit candidates until a sole TFC candidate remains;
identifying said sole remaining TFC candidate as a best fit TFC candidate;
iteratively applying at least one set reduction constraint to said transport format combination set; and
deleting TFC candidates from said transport formation combination set that do not meet said at least one set reduction constraint.

11. The method as set forth in claim 10 wherein said iterative TFC selection algorithm comprises the steps of:

(a) prioritizing a plurality of dedicated transport channels of a TFC set for which a transmission time interval coincides with a current time;
(b) serving said prioritized dedicated transport channels sequentially;
(c) inputting a TFC candidate set in a Start TFCI Sequence;
(d) sorting a plurality of ready logical channels;
(e) inputting to a TFC select routine a maximum number of protocol data units waiting for transmission;
(f) selecting TFC candidates;
(g) updating a Current TFCI Sequence;
(h) selecting the best fit transport format for a current dedicated transport channel;
(i) updating a pre-selected transport format indicator list to form a constraint for the next dedicated transport channel; and
(j) determining whether a transport format has been selected for all of the dedicated transport channels in said TFC set.

12. The method as set forth in claim 11 further comprising the steps of:
going to a next dedicated transport channel when a transport format has not been selected for all of the dedicated transport channels in said TFC set; and
iteratively executing steps (d) through (j) for each dedicated transport channel until a transport format has been selected for all of the dedicated transport channels in said TFC set.

13. The method as set forth in claim 12 further comprising the steps of:
identifying a sole remaining TFC candidate as a best fit TFC candidate after a transport format has been selected for all of the dedicated transport channels in said TFC set.

14. The method as set forth in claim 11 wherein said TFC selection algorithm applies multiple set reduction constraints to eliminate TFC candidates that are not best fit candidates.

15. The method as set forth in claim 14 wherein said multiple set reduction constraints comprise:
a pre-selected transport format indicator list;
an identified size of a transport block; and
a number of transport blocks that equal zero.

16. For use in a wireless telecommunication system comprising a base station and a plurality of mobile stations, user equipment that is capable of selecting a best fit transport format combination (TFC) from a transport format combination set that is assigned to at least one mobile station by said base station, wherein said user equipment comprises:
a protocol stack that identifies TFC candidates in said transport format combination set that are not best fit candidates;
wherein said protocol stack deletes from said transport format combination set said TFC candidates that are not best fit candidates until a sole TFC candidate remains;
wherein said protocol stack identifies said sole remaining TFC candidate as a best fit TFC candidate;
wherein said protocol stack iteratively applies at least one set reduction constraint to said transport format combination set; and
wherein said protocol stack deletes TFC candidates from said transport formation combination set that do not meet said at least one set reduction constraint.

17. The user equipment as set forth in claim 16 wherein said protocol stack iteratively applies at least one set reduction constraint to said transport format combination set; and wherein said protocol stack deletes TFC candidates from said transport formation combination set that do not meet said at least one set reduction constraint.

18. The user equipment as set forth in claim 17 wherein said at least one set reduction constraint comprises one of: a pre-selected transport format indicator list, an identified size of a transport block, and a number of transport blocks that equal zero.

19. The user equipment as set forth in claim 16 wherein said protocol stack applies an iterative TFC selection algorithm to said transport format combination set and progressively deletes TFC candidates from said transport format combination set that said iterative TFC selection algorithm identifies as not best fit TFC candidates.

20. For use in a wireless telecommunication system comprising a base station and a plurality of mobile stations, a method for minimizing a search time for selecting a best fit transport format combination (TFC) from a transport format combination set that is assigned to at least one mobile station by said base station, said method comprising the steps of:
   applying an iterative TFC selection algorithm to said transport format combination set to identify a TFC candidate that is a best fit candidate in said transport format combination set;
   iteratively reducing a size of said transport format combination set to a smaller size;
   iteratively searching said smaller size of said transport format combination set to identify best fit TFC candidates;
   iteratively applying at least one set reduction constraint to said transport format combination set; and
   deleting TFC candidates from said transport formation combination set that to do not meet said at least one set reduction constraint.

21. The method as set forth in claim 20 further comprising the steps of:
   (a) prioritizing a plurality of dedicated transport channels of a TFC set for which a transmission time interval coincides with a current time;
   (b) serving said prioritized dedicated transport channels sequentially;
   (c) inputting a TFC candidate set in a Start TFCI Sequence;
   (d) sorting a plurality of ready logical channels;
   (e) inputting to a TFC select routine a maximum number of protocol data units waiting for transmission;
   (f) selecting TFC candidates;
   (g) updating a Current TFCI Sequence;
   (h) selecting the best fit transport format for a current dedicated transport channel;
   (i) updating a pre-selected transport format indicator list to form a constraint for the next dedicated transport channel; and
   (j) determining whether a transport format has been selected for all of the dedicated transport channels in said TFC set.

22. The method as set forth in claim 21 further comprising the steps of:
   going to a next dedicated transport channel when a transport format has not been selected for all of the dedicated transport channels in said TFC set; and
   iteratively executing steps (d) through (j) for each dedicated transport channel until a transport format has been selected for all of the dedicated transport channels in said TFC set.

23. The method as set forth in claim 22 further comprising the steps of:
   identifying a sole remaining TFC candidate as a best fit TFC candidate after a transport format has been selected for all of the dedicated transport channels in said TFC set.

24. The method as set forth in claim 21 wherein said TFC selection algorithm applies multiple set reduction constraints to eliminate TFC candidates that are not best fit candidates.

25. The method as set forth in claim 24 wherein said multiple set reduction constraints comprise:
   a pre-selected transport format indicator list;
   an identified size of a transport block; and
   a number of transport blocks that equal zero.

* * * * *